(12) United States Patent
Brand et al.

(10) Patent No.: US 9,869,866 B2
(45) Date of Patent: Jan. 16, 2018

(54) TAILORED FREEFORM OPTICAL SURFACE

(71) Applicant: Mitsubishi Electric Research Laboratories, Inc., Cambridge, MA (US)

(72) Inventors: Matthew Brand, Newton, MA (US); Aydan Aksoylar, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/155,200

(22) Filed: May 16, 2016

(65) Prior Publication Data

US 2017/0329145 A1    Nov. 16, 2017

(51) Int. Cl.
| | |
|---|---|
| *G02B 27/09* | (2006.01) |
| *F21S 8/10* | (2006.01) |
| *F21V 5/08* | (2006.01) |
| *G02B 27/00* | (2006.01) |
| *F21Y 101/02* | (2006.01) |

(52) U.S. Cl.
CPC ...... *G02B 27/0927* (2013.01); *F21S 48/1225* (2013.01); *F21V 5/08* (2013.01); *G02B 27/0012* (2013.01); *F21Y 2101/02* (2013.01)

(58) Field of Classification Search
None
See application file for complete search history.

(56) References Cited

U.S. PATENT DOCUMENTS

| | | | |
|---|---|---|---|
| 7,670,038 B2 | 3/2010 | Schug et al. | |
| 8,851,723 B2 | 10/2014 | Peck et al. | |
| 2005/0086032 A1 | 4/2005 | Benitez et al. | |
| 2015/0224919 A1* | 8/2015 | Sobecki | B60Q 1/2615 |
| | | | 353/13 |

FOREIGN PATENT DOCUMENTS

| | | |
|---|---|---|
| CN | 202691905 | 1/2013 |
| WO | 2005012951 A2 | 2/2005 |

OTHER PUBLICATIONS

Li Chen et al, "Mapping Algorithm for Freeform Construciton using Non-ideal Light Sources," Optomechatronic Micro/NANO Devices and Components III: Oct. 8-10, 2007, Lausanne, Switzerland, SPIE Bellingham Wash. vol. 9629, Sep. 23, 2015. pp. 26290E-26290E.

* cited by examiner

*Primary Examiner* — Kristy A Haupt
(74) *Attorney, Agent, or Firm* — Gene Vinokur; James McAleenan; Hironori Tsukamoto

(57) ABSTRACT

An optic has a freeform optical surface transforming incident light emitted by a spatially extended light source into a constellation of images of the spatially extended light source. The images in the constellation are mixed to form a target illumination pattern having a sharp-edge at least along a portion of a boundary. The images include a focused image, and an edge of the focused image participates in forming the sharp-edged boundary the target illumination pattern.

18 Claims, 14 Drawing Sheets

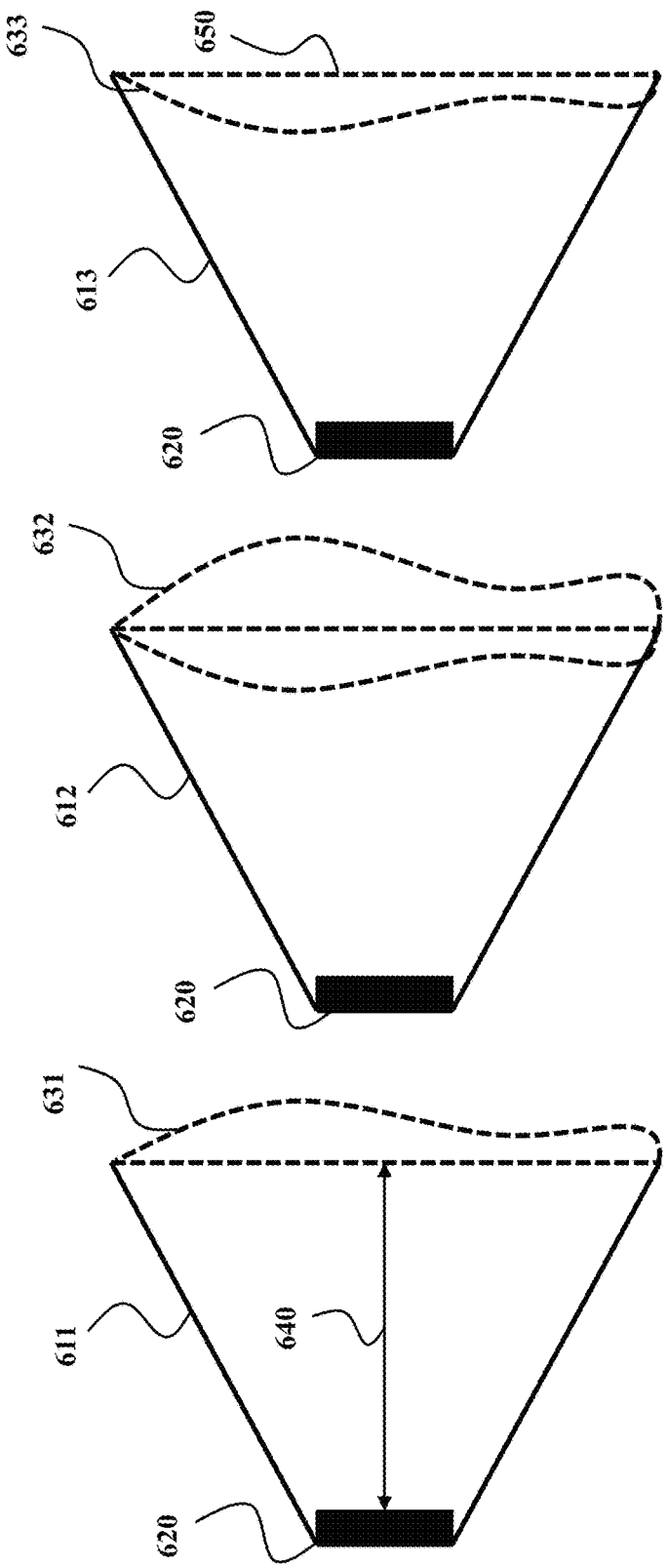

TAILORED FREEFORM OPTICAL SURFACE

FIELD OF THE INVENTION

This invention relates to optics, and more specifically to optics having a freeform optical surface transforming incident light to produce an illumination pattern.

BACKGROUND OF THE INVENTION

The field of non-imaging optics has long sought a method to design optical surfaces that transform an incident light emitted by a light source into an arbitrary illumination pattern. In the last two decades, substantial progress has been made for the zero-étendue case, an idealization where light rays are exactly parallel or exactly diverging from a single point. This idealization allows a one-to-one correspondence between rays in the emitted light and rays in the target illumination pattern. This one-to-one correspondence reduces the design problem to determining an optical surface whose reflections or refractions implement a one-to-one mapping between the spatial density of rays in a cross-section of the emitted light and the spatial density of rays in the target illumination pattern. If a smooth mapping is possible between the initial and target densities, which is almost always the case for the zero-étendue systems, then that mapping can be found using the methods borrowed from the field of optimal mass transport. The resulting optics can produce very complicated illumination patterns, for example, projecting photographic images. These optical surfaces are generally denoted as freeform optical surfaces, simply because their shapes are more complicated that any of the simple algebraic surfaces typically associated with lenses and mirrors.

In reality, the zero-étendue light source does not exist. Practical light sources, e.g., light-emitting diodes (LED), have spatial extent, i.e., light rays are emitted from an area, not a point, and these rays cross during their propagation, making one-to-one mappings impossible, and pushing the problem outside the scope of what optimal mass transport can solve. If a freeform optical surface is illuminated by a spatially extended light source, the resulting illumination pattern is significantly blurred, much as a shadow on a cloudy day becomes soft and indistinct. According to the second law of thermodynamics, this blurring is inescapable, so freeform optics for spatially extended light sources are typically designed to achieve approximately uniform illumination in some bounded area surrounded by soft blurry illumination fall-offs.

For example, a method of simultaneous multiple surfaces (SMS) achieve uniform illumination by directing rays of light from the edge of a spatially extended light source to desired target points. In such a way, the rays of light form some unknown but acceptable density; however, the edges of the resulting illumination pattern are still blurred.

At the best of our knowledge, currently there are no methods that can transform incident light from the spatially extended light source into a target illumination pattern with sharp edges. However, such a method can be beneficial for a number of optical applications, such as optics for signage illumination and optics for headlight of a vehicle.

SUMMARY OF THE INVENTION

Some embodiments of the invention are based on recognition that a shape of a spatially extended light source can have sharp boundaries and a freeform optical surface can transform incident light emitted by the spatially extended light source into an image of the extended light source that also has the sharp boundaries. However, a typical target illumination pattern desired to be produced by illumination of the freeform optical surface has a much more complex shape than the shape of the spatially extended light source.

Some embodiments of the invention are based on a realization than freeform optical surface can be designed to transform the incident light into multiple images of the spatially extended light source. Moreover, those multiple images can be strategically arranged, such that the images collectively form the target illumination pattern. Such a collective arrangement of multiple images of spatially extended light source is referred herein as a constellation of images. The images in the constellation can be focused and/or unfocused, but at least some of the focused images can be arranged along an outline of the target illumination pattern to form its sharp-edged boundary.

To that end, some embodiments disclose an optic having a freeform optical surface transforming incident light emitted by a spatially extended light source into a constellation of images of the extended light source. The images in the constellation are mixed to form an illumination pattern having a sharp edge at least along a portion of a boundary. The images include a partially focused image of the light source and an edge of the focused image participates in forming the sharp-edged boundary the illumination pattern.

Some embodiments of the invention are based on another realization that a smoothness of the illumination pattern formed by a mixture of multiple images can be achieved by tiling the two adjacent images together or by overlaying smeared or unfocused images such that the collective intensity of the overlaid images is comparable with the intensity of tiled images. For example, in one embodiment at least two images in the constellation of images are adjacent to each other to form a first smooth joint image having a first intensity, and at least two images in the constellation of images are at least partially overlay each other to form a second smooth joint image having a second intensity. In this embodiment the images forming the second smooth joint image are smeared such that a difference between a first intensity and a second intensity is less than a threshold.

Some embodiments of the invention are based on recognition that such a constellation of the images and the corresponding freeform optical surface that can produce this constellation can be determined for a zero-étendue light source using, e.g., an optimal mass transport method, but similar computation for the spatially extended light source is computationally prohibitive. However, if the freeform optical surface determined for the zero-étendue light source is illuminated with the spatially extended light source, the resulted illumination pattern is blurred, i.e., does not have the sharp-edged boundaries.

However, some embodiments of the invention are based on a realization that the undesirable blur introduced by the spatially extended light source can be advantageously exploited. Specifically, it was realized that the blur introduced by the spatially extended light source can be determined and described by a blur function. If that blur function is known, it is possible to design a freeform optical surface that produces such a new illumination pattern that when this new illumination pattern is blurred according to the blur function, the blurred new illumination pattern is actually the target illumination pattern. This new illumination pattern is referred herein as a deblurred illumination pattern.

Usually, the kernels in the blur function vary for different pixels of the target illumination pattern. To that end, such a blur function is usually a spatially variant blur function. Accordingly, some embodiments of the invention determined such a freeform optical surface, which when illuminated by a zero-étendue light source, forms a deblurred illumination pattern produced by deblurring the target illumination pattern with a spatially variant blur function.

Accordingly, one embodiment discloses an optic having a freeform optical surface transforming incident light emitted by a spatially extended light source into a constellation of images of the spatially extended light source, wherein the images in the constellation are mixed to form a target illumination pattern having a sharp-edge at least along a portion of a boundary, wherein the images include a focused image, and wherein an edge of the focused image participates in forming the sharp-edged boundary the target illumination pattern.

Another embodiment discloses a method for fabricating an optic. The method includes determining a freeform optical surface transforming incident light emitted by a spatially extended light source into a constellation of images of the spatially extended light source, wherein the images are mixed to form a target illumination pattern having a sharp-edge at least along a portion of a boundary, wherein the images include a focused image, and wherein an edge of the focused image participates in forming the sharp-edged boundary the target illumination pattern; and fabricating the optic having the freeform optical surface.

Yet another embodiment discloses a non-transitory computer readable storage medium embodied thereon a program executable by a processor for performing a method. The method includes determining an initial freeform optical surface transforming incident light emitted by a zero-étendue light source into a target illumination pattern; determining a spatially variant blur function that captures a blur of the target illumination pattern illuminated by a spatially extended light source; deblurring the target illumination with the spatially variant blur function to determine a blurred illumination; and determining a freeform optical surface transforming incident light emitted by a zero-étendue light source into the target illumination pattern, such that the freeform optical surface transforming incident light emitted by the spatially extended light source into a constellation of images of the extended light source, wherein the images are mixed to form the target illumination pattern having a sharp-edge at least along a portion of a boundary, wherein the images include a focused image, and wherein an edge of the focused image participates in forming the sharp-edged boundary the target illumination pattern.

BRIEF DESCRIPTION OF THE DRAWINGS

FIGS. 6A, 6B, and 6C are examples of luminaire having the optics determined according to various embodiments of the invention;

DETAILED DESCRIPTION OF THE PREFERRED EMBODIMENT

Some embodiments of the invention are based on insight coining from imaging optics that while spatially extended light sources do produce blurred illumination patterns (for example, soft shadows), it is possible to design an optical surface that produces multiple focused images of a spatially extended light source, each of which inherits the sharp edges of the boundaries of the light source itself.

Figure 1:
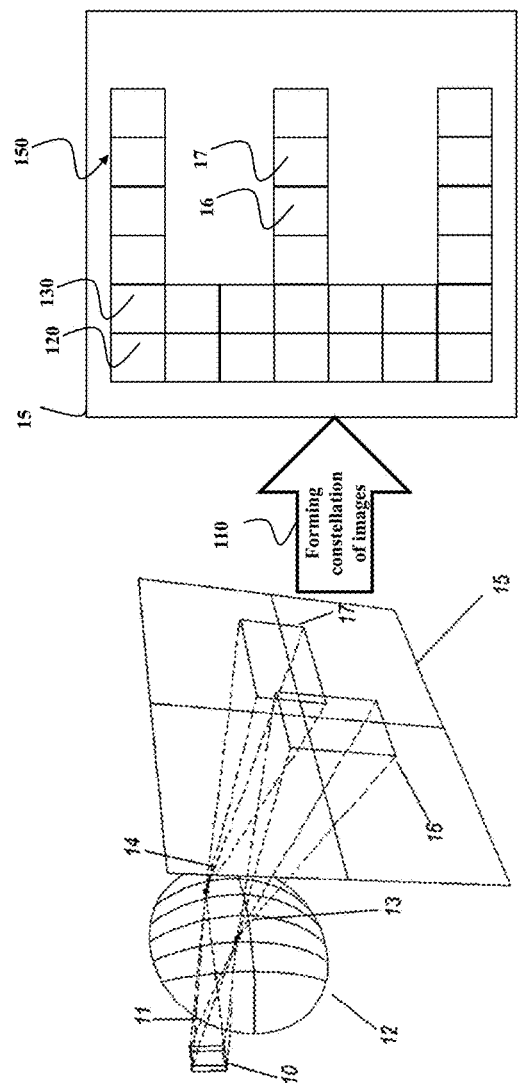
FIG. 1 is an illustration of imaging optics producing an image of a light source used by some embodiment of the invention to form a target illumination pattern.

FIG. 1 shows an illustration of imaging optics producing an image of a light source used by some embodiment of the invention to form a target illumination pattern. Such an image of a light source is also referred herein as a source-image. The source-image can be focused or unfocused.

A spatially extended light source 10 emits rays 11 of lights into optic having an optical surface 12. Exemplary points or pinholes 13 and 14 define tiny differential areas on the exit aperture of the spatially extended light source 10 or on the optical surface 12. The light incident to the optical surface is transformed by the points of the optical surface and projected on a screen 15. In this example, infinitesimal intensity distributions 16 and 17 projected on the screen 15 are the source-images of the light source 10 coining from points 13 and 14, respectively. Each of the source-image 16 or 17 can have the sharp edges, but if the mutual arrangement of those images 16 and 17 is uncontrolled, the images are superimposed and the sharp-edge boundaries of those images can be lost.

Some embodiments are based on a realization that the mutual arrangement of the images of the light source can be controlled to form 110 a constellation of those images, such that the images in the constellation are mixed to form a target illumination pattern having a sharp-edge at least along a portion of a boundary. For example, one embodiment produces a sharp-edged illumination pattern 150 from a spatially extended light source 10 by tiling images of the light source, e.g., images 120 and 130 as well as images 16 and 17, around the boundary of the target image.

Additionally or alternatively, one embodiment produces images of the light source that are focused in one direction and blurred or smeared in another, obtaining long sharp-edged contours in the illumination pattern. Optionally, the images can include an unfocused image forming interior of the illumination pattern. In some embodiments, the formation of the constellation is achieved automatically by the deblurring and surface estimation procedures, as described below.

Figure 2:
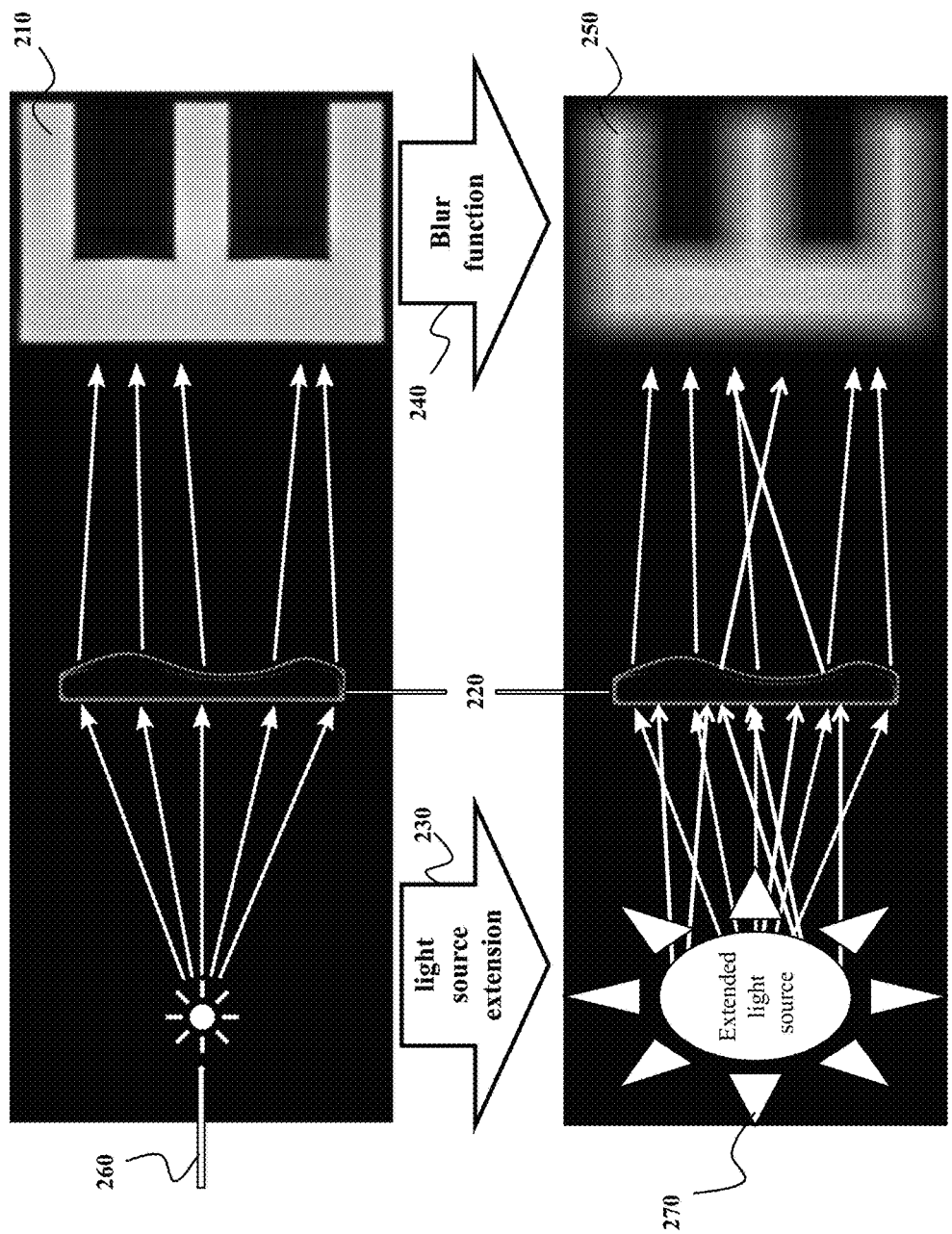
FIG. 2 is an illustration of a problem addressed by some embodiments of the invention.

FIG. 2 shows an illustration of a problem addressed by some embodiments of the invention. For example, an illumination pattern 210 and the corresponding freeform optical surface 220 that can produce a constellation of images forming the pattern 210 can be determined for a zero-étendue light source 260. For example, such an optical surface 220 can be determined using an optimal mass transport method. However, the similar determination of the spatially extended light source is computationally impractical. If the freeform optical surface 220 determined for the zero-étendue light source 260 is illuminated with the spatially extended light source 270, the resulted illumination pattern 250 is blurred, i.e., does not have the sharp-edged boundaries.

Some embodiments of the invention are based on realization that the relationship 230 between illumination of the optical surface 220 by the zero-étendue light source 260 and the spatially extended light source 270 can be described by a blur function 240 relating the sharp-edged illumination pattern 210 and its blurred version 250. Some embodiments of the invention are based on another realization that the undesirable blur introduced by the spatially extended light source can be advantageously exploited.

Figure 3:
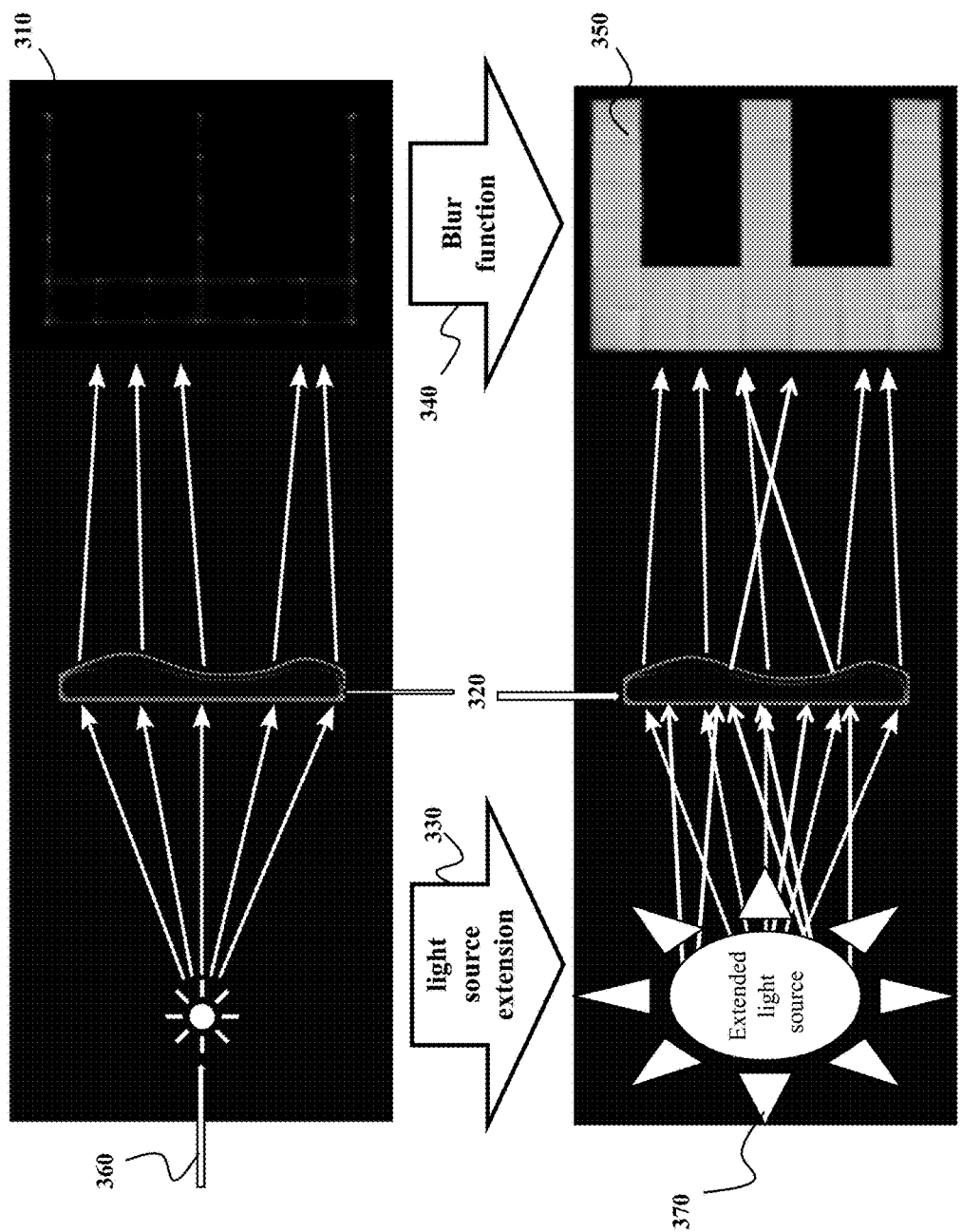
FIG. 3 is an illustration of an exploitation of a blur function by some embodiments of the invention.

FIG. 3 shows an illustration of an exploitation of a blur function by some embodiments of the invention. If a blur function 340 providing a relationship 330 between illumination of the optical surface 320 by the zero-étendue light source 360 and the spatially extended light source 370 is known, it is possible to design a freeform optical surface 320 for a zero-étendue light source 360 that produces such a new illumination pattern 310 that when this new illumination pattern 310 is blurred according to the blur function 340, the blurred new illumination pattern 350 is actually the target illumination pattern. This new illumination pattern 310 is referred herein as a deblurred illumination pattern.

Figure 4:
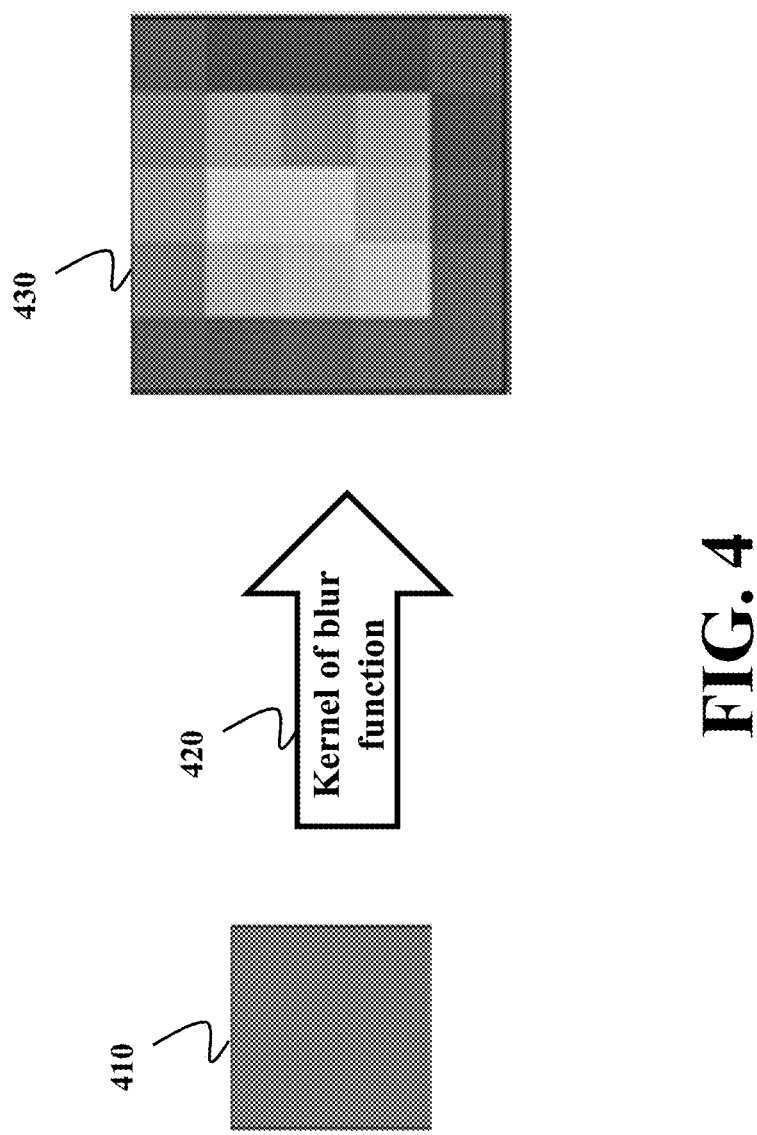
FIG. 4 is an example of a kernel of the blur function that transforms a pixel of an image to its blurred version.

FIG. 4 shows an example of a kernel 420 of the blur function 240 that transforms a pixel 410 to its blurred version 430. Usually, the kernels in the blur function vary for different pixels of the target illumination pattern and/or points on the freeform optical surface. To that end, the blur function 340 is usually a spatially variant blur function. Accordingly, some embodiments of the invention determined such a freeform optical surface, which when illuminated by a zero-étendue light source, forms a deblurred illumination pattern produced by deblurring the target illumination pattern with a spatially variant blur function.

Figure 5:
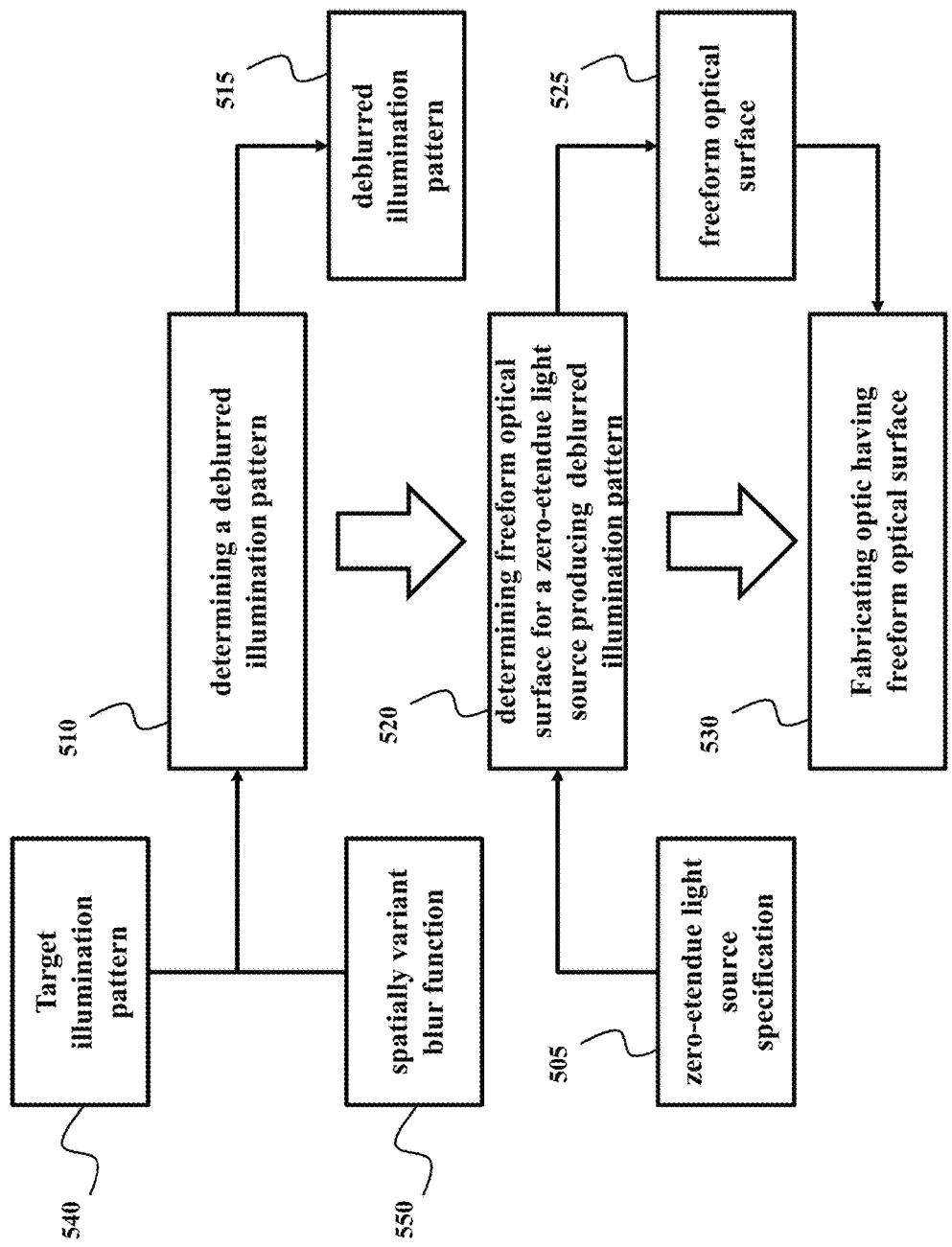
FIG. 5 is a block diagram of a method for fabricating an optic having a freeform optical surface for producing a target illumination pattern according to one embodiment of the invention.

FIG. 5 shows a block diagram of a method for fabricating an optic having a freeform optical surface for producing a target illumination pattern according to one embodiment of the invention. The method determines 510 a deblurred illumination pattern 515 by deblurring the target illumination pattern 540 with a spatially variant blur function 550. The method determines 520 the freeform optical surface 525 for a zero-étendue light source having a specification 505, such that the freeform optical surface 525 illuminated by the zero-étendue light source 505 forms the deblurred illumination pattern 515. In such a manner, when the freeform optical surface 525 is illuminated by the spatially extended light source having relationship to the zero-étendue light source 505 captured by the spatially variant blur function 550, the incident light emitted by the spatially extended light source is transformed by the freeform optical surface 525 to form the target illumination pattern 540 having a sharp-edge at least along a portion of a boundary.

Next, the method fabricates 530 the optics having a freeform optical surface 525. For example, one embodiment fabricates the optics using injection molding of plastic optics. The development of electrical-discharge machining (EDM) has provided means for fabricating optical-quality freeform surfaces in the metal of the mold. EDM in turn depends upon five-axis and six-axis machining to produce the desired freeform surface as a carbon electrode of identical dimensions as the part to be produced. This electrode is used to electrically burn into metal a concavity matching its own shape, thereby providing a mold cavity that imparts the desired shape to molten plastic. Beyond the replicative methods of injection molding, freeform surfaces can be produced directly in some optical materials, such as acrylic, with multi-axis machining techniques, albeit at greater per-part expense than injection molding and thus typically employed for prototypes. Many other freeform prototyping technologies exist, including 3D-printing of optical polymers and robotic deformation of metallic sheets. At present, all are expensive and approximate.

FIGS. 6A, 6B, and 6C shows examples of luminaire having the optics determined according to various embodiments of the invention and an extended light source 620 arranged in the luminaire to emit the light onto the freeform optical surface. For example, the extended light source 620 can be arranged at a distance 640 from the freeform optical surface, and such a distance is considered in the determination of the freeform optical surface. For example, in some embodiments, the shape of the freeform optical surface is a function of the shape of the emitting area of the extended light source and an arrangement of the extended light source with respect to the freeform optical surface.

In different embodiments, the freeform optical surface can be one or double sided. For example, in the exemplar luminaire 611, the optic 631 has one sided freeform optical surface. The freeform surface of the optic 631 is the furthest surface from the light source 620, and the closest surface is flat. In the exemplar luminaire 612, the freeform optical surface of the optic 632 is double sided, i.e., both sides of the optic are freeform optical surfaces. In the exemplar luminaire 613, the closest to the light source 620 surface of the optic 633 has a freeform.

In some embodiments, the luminaire projects the target illumination pattern on a screen external to the luminaire. Examples of such a screen include a wall or any other flat surface. In alternative embodiment, the optics of luminaire itself can serve as a screen. For example, in one embodiment, a surface 650 of the optic 633 opposite to the freeform optical surface is frosted, such that the illumination pattern is formed on the frosted surface. Additionally or alternatively, the luminaire can have a secondary optics for imaging and display purposes.

Figure 7A:
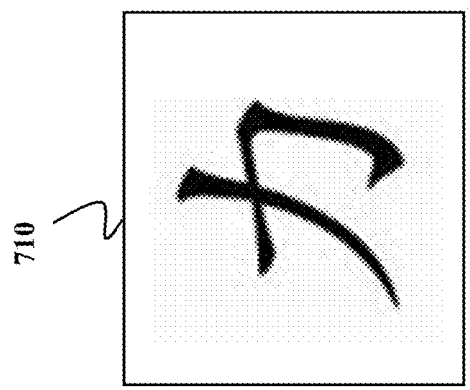
FIGS. 7A, 7B, and 7C are different nonlimiting examples of various target illumination patterns produced by some embodiments.
Figure 7B:
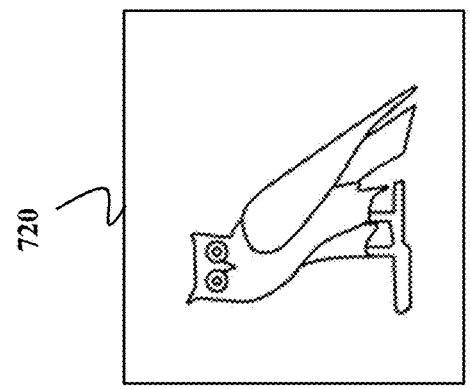
Figure 7C:
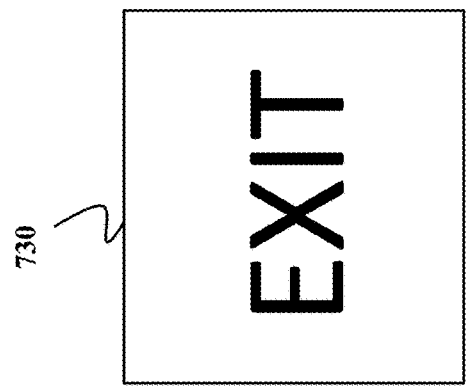

FIGS. 7A, 7B, and 7C shows different nonlimiting examples of various target illumination patterns produced by some embodiments. For clarity purposes, the illuminated pattern shown using black line. In practice, those examplar images can be inversed. For example, in some embodiments, the illumination pattern includes a glyph 710 or an artistic image 720. For example, the illumination pattern can include letters forming a word 730. In some embodiments, the illumination pattern is an asymmetrical pattern. The illumination pattern can also have brightness gradients.

Figure 8:
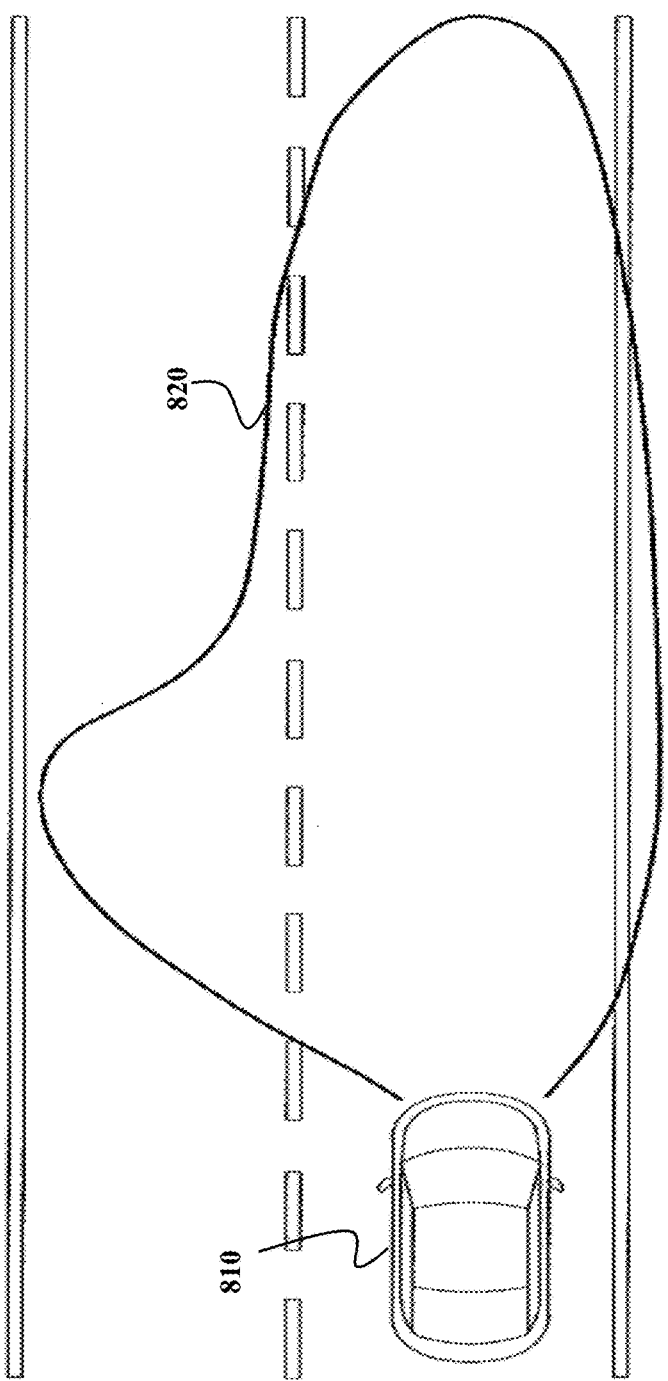
FIG. 8 is a schematic of an embodiment wherein the luminaire forms at least a part of a headlight of a vehicle.

FIG. 8 shows a schematic of an embodiment wherein the luminaire forms at least a part of a headlight of a vehicle 810. In this embodiment, the extended light source emits the light beams along an optical axis of the headlight to produce the illumination pattern 820 including an asymmetrical low-high beams pattern for illumination of a road surface. The illumination pattern 820 is asymmetrical because the beam projected by the headlight is lower on the left side of the vehicle than on the right side.

Notably, not all illumination patterns can be well approximated by the embodiments. The illumination pattern cannot have illuminated features smaller than a focused image of the light source, though finer features can be realized by the absence of light. As per the second law of thermodynamics, perfect deblurring of general images is impossible in geometric optics. However, the embodiments work well for a useful class of target illumination patterns, in particular, signage, where the boundary of the figure should be sharp but the interior of the figure can be less controlled. The optics designed according to principles of some embodiments of the invention, can produce the target illumination pattern having a sharp-edge at least along a portion of a boundary having an edge of the focused image participates in forming the sharp-edged boundary the target illumination pattern.

As used herein, the sharp-edged boundary means that a rate of change of light intensity across the sharp-edge of the illumination boundary is substantially similar, i.e., less than 5% of a difference, to the rate of change of the light intensity at an edge of a focused image of the light source.

Figure 9:
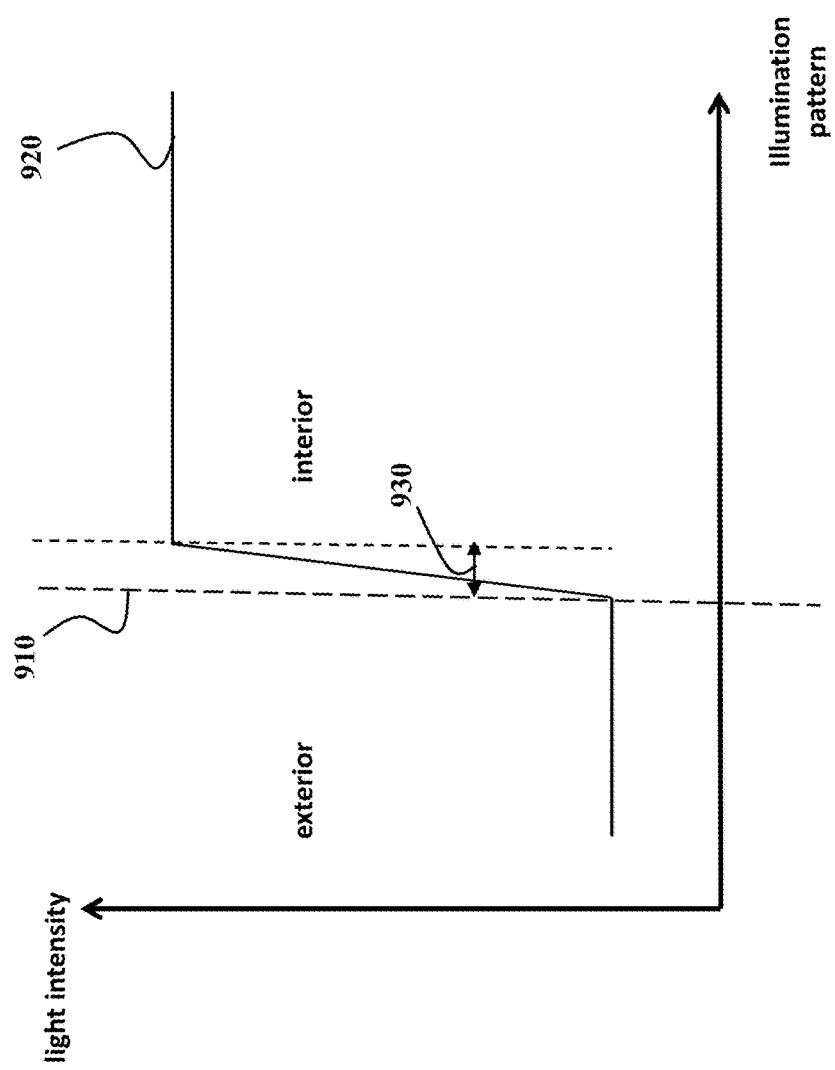
FIG. 9 is a graph of light intensity for a sharp-edged boundary of the target illumination pattern according to some embodiments of the invention.

FIG. 9 shows a graph 920 of light intensity for a sharp-edged boundary of the target illumination pattern according to some embodiments of the invention. The boundary 910 separates exterior from the interior of the illumination pattern. As seen on the graph, the rate of change of the light intensity causes the light intensity to change from minimal to maximal values within a predetermined distance 930 from the boarder 910. Such a distance 930 is found in the focused images and governed by the second law of thermodynamic.

Figure 10:
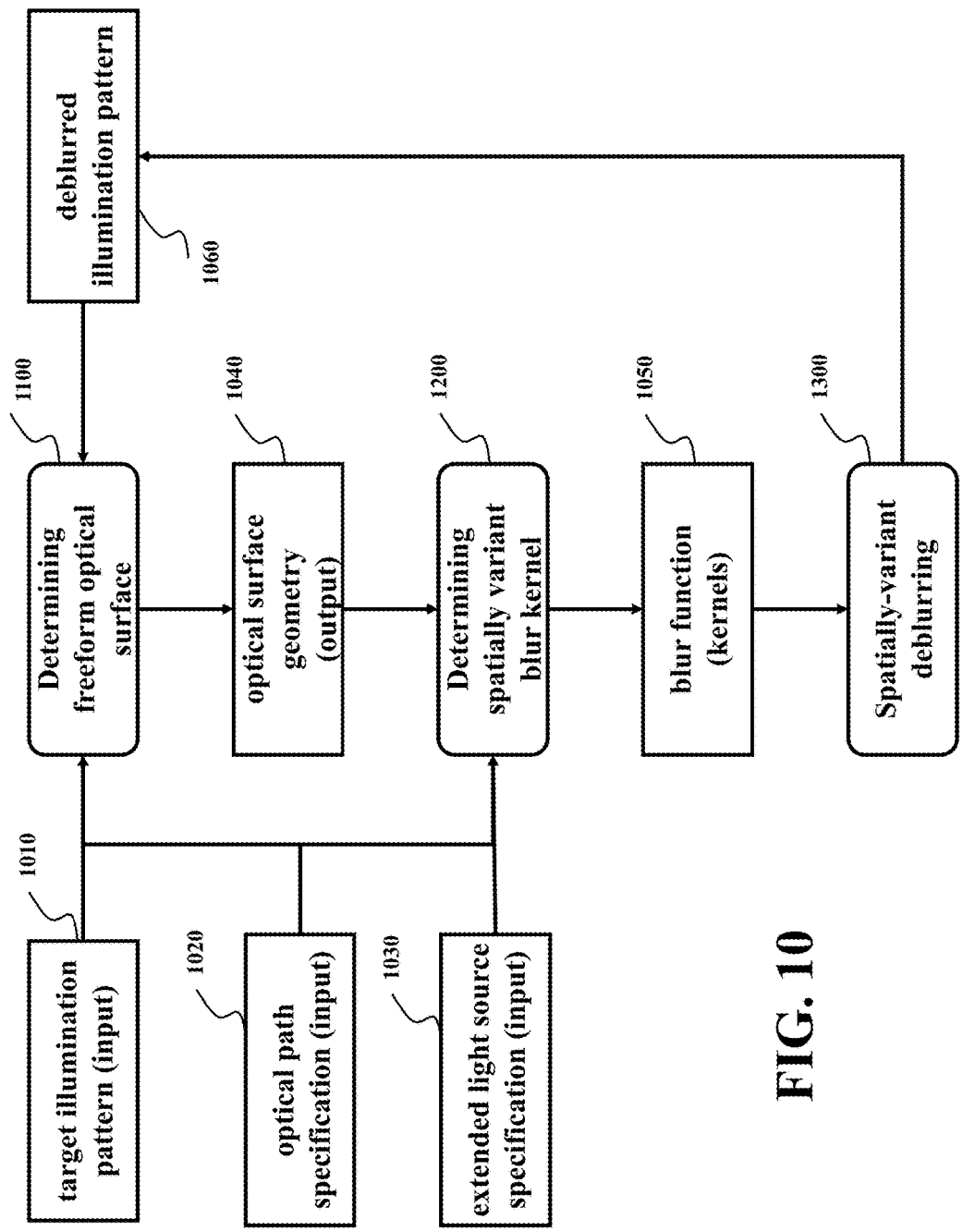
FIG. 10 is a block diagram of a method for determining geometry of a freeform optical surface according to some embodiments of the invention.

FIG. 10 shows a block diagram of a method for determining geometry of a freeform optical surface according to some embodiments of the invention. Steps of the method can be performed using a processor. The method determines 1100 the shape 1040 of an optical surface that produces a target illumination pattern 1010, e.g., specified as a digital image, from a zero-étendue light source. The determination can use the specifications 1020 describing the optical path from the zero-étendue light source toward the freeform optical surface. Next, the method analyzes the freeform optical surface to determine 1200 a spatially-varying blur function 1050 that a spatially extended light source 1030 induces in the illumination pattern 1010. This blur function is used as a proxy for the blur function of the final optic.

The method further performs deblurring 1300 of the target illumination pattern 1010 with the spatially-varying blur function 1050 to determine a new deblurred illumination pattern such that, when a new freeform optical surface 1040 is generated or updated for the deblurred illumination pattern using the determination 1100 for the zero-étendue light source, and updated freeform optical surface is illuminated with the extended light source having specification 1030, the resulting illumination pattern approximately (and sometimes perfectly) reproduces the target illumination pattern 1010 with sharp edges to an extent that is physically possible using geometric optics. The method of FIG. 10 can update the freeform optical surface 1040 iteratively, but usually a single iteration of the method is sufficient to achieve a desired result.

Figure 11:
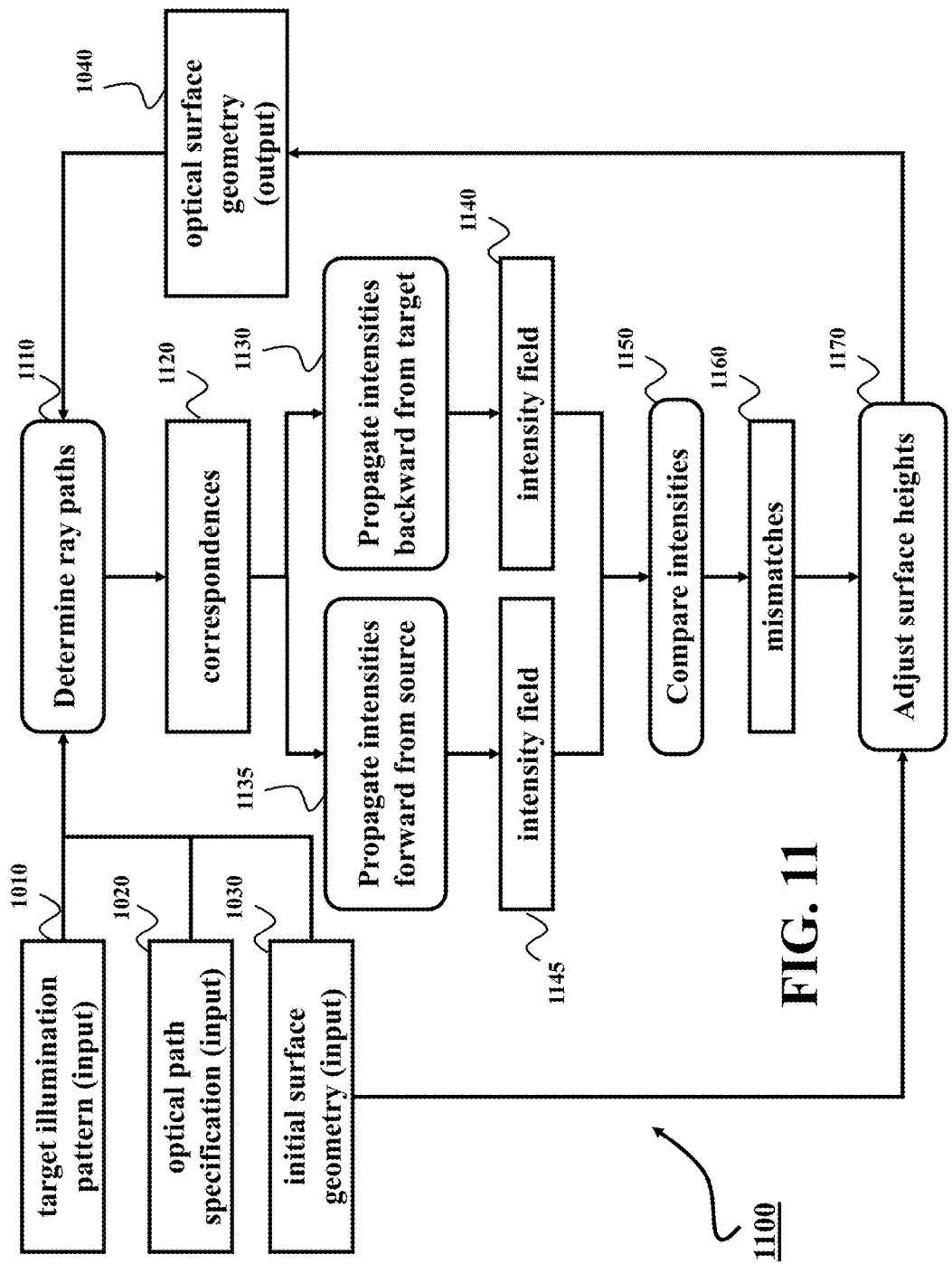
FIG. 11 is a flowchart of a method used by some embodiments of the invention for determining a freeform optical surface that transforms incident light from a zero-étendue light source into a target illumination pattern.

FIG. 11 shows a flowchart of a method used by some embodiments of the invention for determining 1100 a freeform optical surface that transforms incident light from a zero-étendue light source into a target illumination pattern. The target illumination pattern, e.g., a photograph, is a spatial distribution of bright and dark areas. Bright areas are reproduced by converging many light rays into a finite area; dark areas are reproduced by diverging few light rays so that few fall into an area. In geometric optics, converging and diverging can be accomplished by pulling up or pushing down parts of an optical surface to produce hills and valleys; the amount of vergence is then determined by the curvature of these surface features.

Some embodiments of the invention use the laws of geometric optics to establish a one-to-one correspondence 1120 between locations on the freeform optical surface 1040 and locations in the target illumination pattern 1010. If the light arriving at a point on the optical surface from the light source does not match the light needed at the corresponding point on the target illumination pattern, the optical surface is pulled up or pushed down according to a mathematical rule which combines the optimal mass transport principle and the physics of light propagation at the optical surface. This procedure is repeated until the optical surface stabilizes at the desired shape.

For example, beginning with an target illumination pattern 1010 and an initial guess about the geometry of the optical surface 1030, the physical laws of reflection or refraction are applied to the optical path specification to determine 1110 the paths of light rays 11 from a zero-étendue light source located at the spatially extended light source 10 to the optical surface 12 and from there to the projection surface 15, thereby establishing correspondences 1120 between points on the optical surface and points on the projection surface. Using these rays and correspondences, the provided light intensity values are propagated forward 1135 from the light source and the desired light intensities are propagated backward 1130 from the target illumination pattern, until both reach the optical surface.

Propagation obeys the laws of physics, specifically, that intensities increase in value where rays converge and decrease in value where rays diverge. This results in two fields of intensity values that are compared 1150 by subtracting one field from the other, yielding a field of mismatch values 1160. At each point P on the optical surface, the surface height is adjusted 1170 by a value that is proportional to the mismatch value at P times the derivative dT/ds, which is the rate at which the corresponding point Q on the projection surface moves when the slope of the optical surface at P increases by some infinitesimal value ds. This derivative is determined from straightforward application of law of reflection or refraction to the geometry of the optical path 1020. This procedure is repeated until the mismatch values are driven to zero or as close to zero as the designer requires.

Alternative embodiments use different and more approximate ways of estimating the geometry of the freeform optical surface geometry. For example, one embodiment directly uses the mathematical methods of optimal mass transport to directly compute an energy-conserving correspondence between an image of the radiance pattern of the light source and the desired irradiance pattern of the target illumination image. This correspondence is used as a proxy for the correspondence 1120 between points on the optical surface and points on the projection surface. The physical laws of refraction or reflection can be used to calculate a field of surface normals, also known as perpendiculars that satisfy these correspondences. Then standard integration methods from mathematical physics can be used to estimate a surface geometry that approximately exhibits these surface normals. This procedure is simple but not always optimal.

Yet another embodiments uses partitions the target illumination pattern into thousands of tiny patches, and for each patch, calculates a Cartesian optic to focus light from the source onto that patch. The Cartesian optics are then all superimposed and their thicknesses adjusted until the amount of light collected by each Cartesian optic is approximately equal to the total irradiance energy desired in its target patch.

Figure 12:
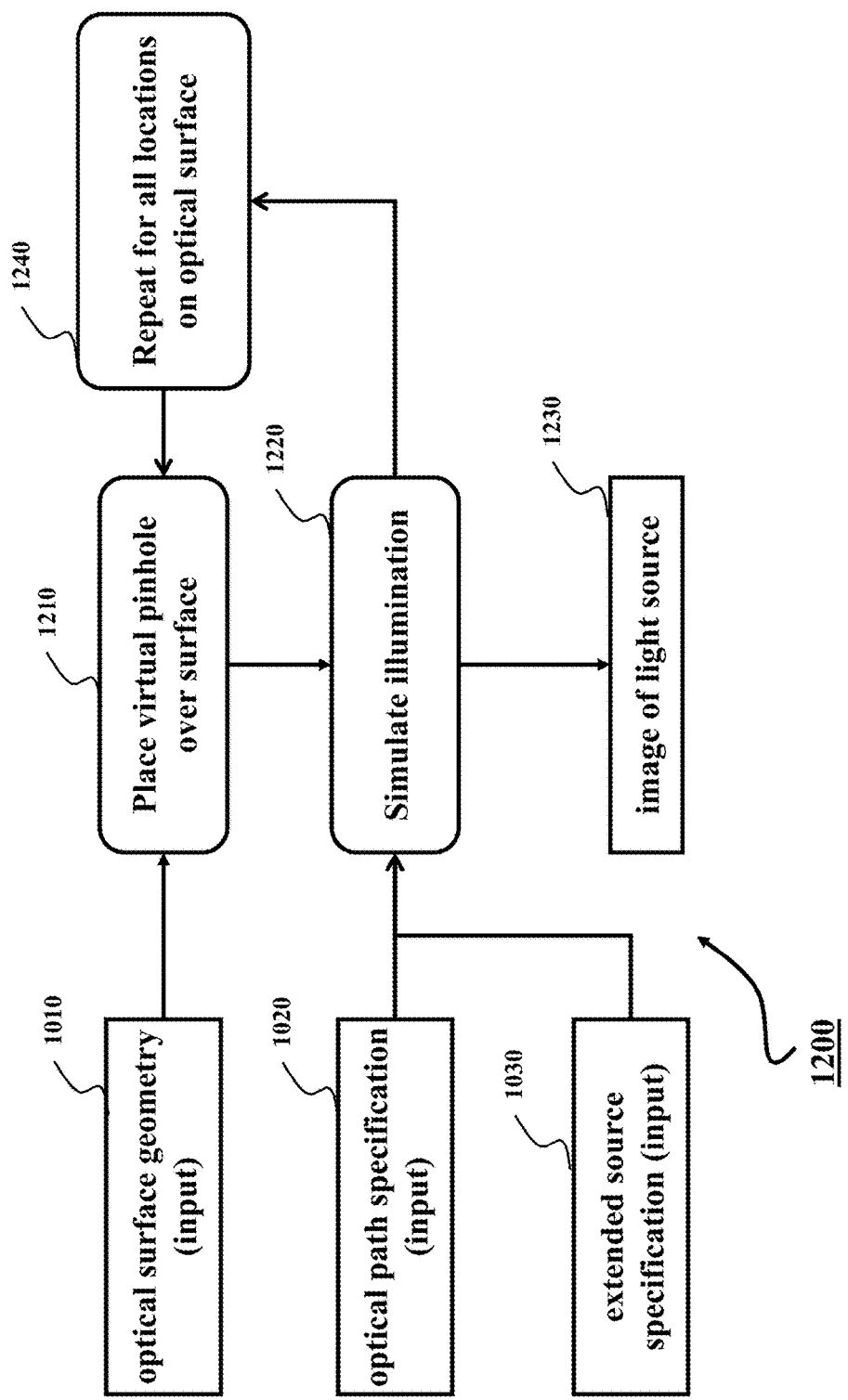
FIG. 12 is a block diagram of a method for determining the spatially variant blur function according to one embodiment of the invention.

FIG. 12 shows a block diagram of a method for determining 1200 the spatially variant blur function according to one embodiment of the invention. The spatially variant blur function provides how the target illumination pattern produced the method 1100 of FIG. 11 is degraded by the introduction of the spatially extended light source 1030. For example, the method simulates placing 1210 a pinhole over some point on the freeform optical surface, blocking out the remainder of the surface, and illuminating 1220 the blocked freeform optical surface with the spatially extended light source 1030. The resulting illumination pattern is an image 1230 of the extended light source, displaced and possibly distorted by the optical surface exposed by the pinhole.

This simulation is repeated 1240 for every point on the freeform optical surface, and the resulting set of images 1230, denoted as "kernels", is used as a proxy for the spatially variant blur function which the final version of the freeform optical surface will cancel. These images can be obtained by simulating the optical path 1020, with pinhole, in an off-the-shelf ray-tracer, which is a piece of software that simulates light propagation in complicated 3D scenes. A kernel image can also be approximated by propagating rays from the boundary of the light source through the boundary of the pinhole, yielding a closed curve on the projection surface which we fill uniformly with the remaining light from the source to obtain the image.

Figure 13:
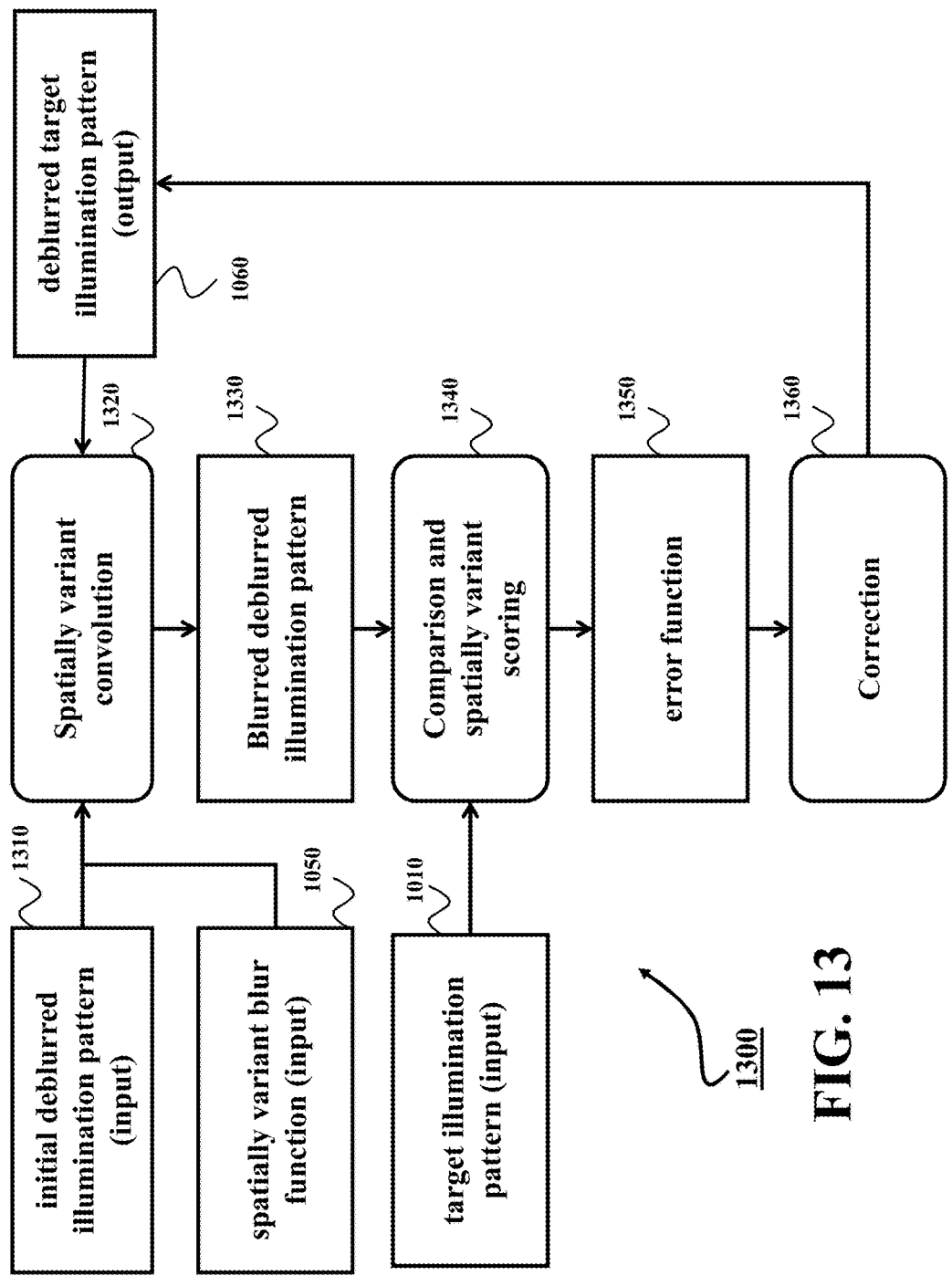
FIG. 13 is a flow chart of a method for the spatially-variant deblurring according to some embodiments of the invention.

FIG. 13 shows a flow chart of a method for the spatially-variant deblurring 1300 according to some embodiments of the invention. This method deblurs the target illumination pattern with respect to spatially variant blur function 1050 and spatially variant objective. The method can be performed iteratively starting with the initial estimation 1310 of the deblurred illumination pattern using a correction loop that iterates until a termination condition is met.

For example, one embodiment performs a spatially variant deblurring by determining 1320 a spatially variant convolution of the non-negative combination of kernels. This combination forms the deblurred illumination pattern 1330 that approximates the target illumination pattern 110. The quality of the approximation can be determined by comparing 1340 the target illumination pattern with the blurred version of the deblurred illumination pattern 1330. For example, because most aesthetically appealing solutions involve tiling and smearing images of the light source, some embodiments measure the quality of an approximation with an error function 1350 that favors smooth solutions, but allows the boundaries of the target figure to shift slightly so that "tiles" can fit together neatly within the figure.

Deblurring can be accomplished by minimizing an error function 1350, e.g., $f(d)=(\|Bd-t\|_2)^2+\lambda(\|\nabla(Bd)\|_W)^2$ subject to the constraint that $d \geq 0$, where d is a solution vector including all the values an estimate of the deblurred target illumination pattern 1310 and 1060; t is a vector including all the values in the target illumination image 1010, in the same order; B is the spatially variant blur function 1050, for example a matrix whose $i^{th}$ column includes all the values of the blur kernel associated with the $i^{th}$ location or pixel on the optical surface; Bd is a matrix-vector product giving the blurred version 1330 of the deblurred image as a spatially variant convolution 1320; Bd−t is a vector of mismatch values determined in comparison 1340 with the target illumination image; $(\|Bd-t\|_2)^2$ is the sum-squared difference between the target illumination pattern and simulated illumination pattern; $\nabla(Bd)$ is the Laplacian of the simulated illumination pattern, essentially an image that maps out its brightness variations; and $(\|\nabla(Bd)\|_W)^2$ sums the squares of these variations except when they are located near where sharp edges are desired in the target illumination pattern. This penalizes unwanted changes in brightness inside the final illumination pattern, but does not penalize sharp illumination changes, e.g., edges, that are displaced a short distance from the figure boundaries in the original target illumination pattern. From the error 1350 some embodiments determine a correction 1360 by gradient descent or a modified Richardson-Lucy operator, and apply this correction to the estimate of the deblurred illumination pattern 1060. This process is repeated until the estimate converges to a fixed non-negative vector of blur kernel combination weights 1060 that minimizes the error.

The solution 1060 becomes the deblurred illumination pattern, and when the method 1100 is applied to design the freeform optical surface from the deblurred illumination pattern 1060, the result is a lens or mirror that combines images of the spatially extended light source to produce the original target illumination pattern.

Typically the final optical surface produces an illumination pattern that includes a mix of tiling, smearing, and blending images of the light source. For example, in one embodiment at least two images in the constellation of images are adjacent to each other to form a first smooth joint image having a first intensity, and at least two images in the constellation of images are at least partially overlay each other to form a second smooth joint image having a second intensity. In this embodiment the images forming the second smooth joint image are smeared such that a difference between a first intensity and a second intensity is less than a threshold. The value of the threshold is governed by the requirement for smoothness of the illumination pattern.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Figure 14:
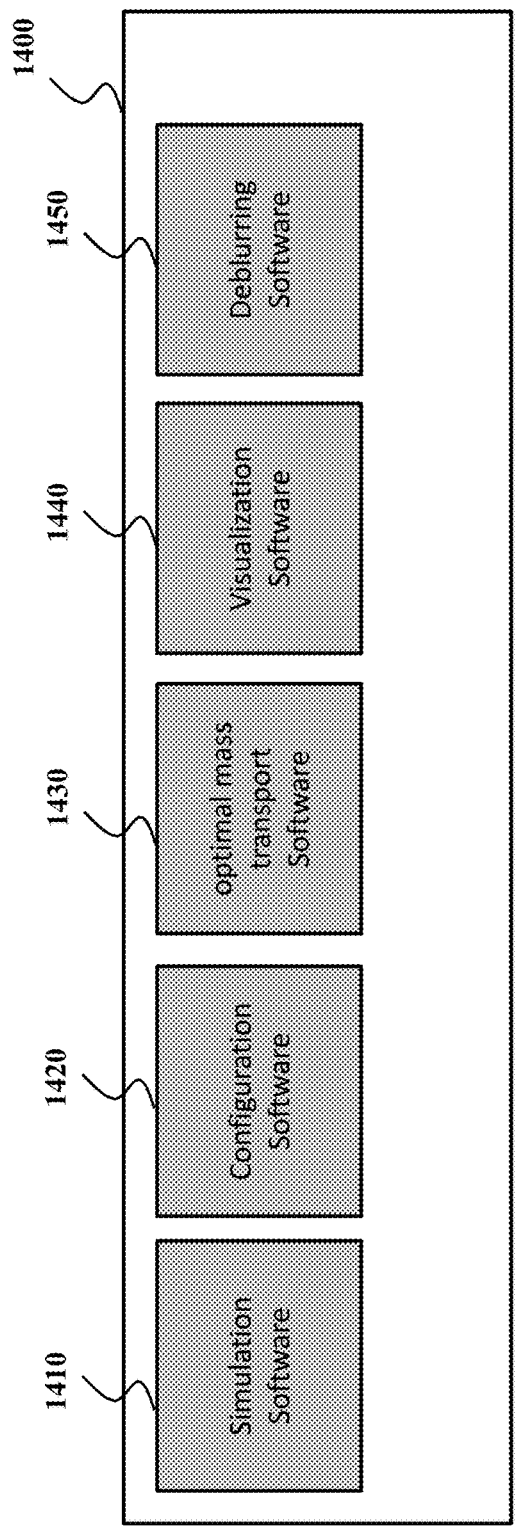
FIG. 14 is an exemplar schematic of a non-transitory computer readable medium embodied thereon a program executable by a processor for performing methods according to different embodiments of the invention.

FIG. 14 shows an exemplar schematic of a non-transitory computer readable medium 1400 embodied thereon a program executable by a processor for performing methods according to different embodiments of the invention. In this example, the program is organized in a number of software modules.

For example, the simulation software 1410 is responsible for simulating the propagation of the lights. The configuration software 1420 is responsible for selecting different parameters of the methods, such as the target illumination pattern, the shape of the spatially extended light source, and/or the arrangement of the spatially extended light source with respect to the freeform optical surface. In some implementations, the configuration software directly or with help of visualization software 1440 receives the configuration parameters from the user of the method. The optimal mass transport software 1430 determines the freeform optimal surface for the zero-étendue light source and deblurring software 1450 determines the blur function and the deblurred illumination pattern. Visualization software 1440 can also render the final version of the freeform optical surface on a display device to visualize the structure of the optic and/or resulting illumination pattern.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An optic having a freeform optical surface transforming incident light emitted by a spatially extended light source into a constellation of images of the spatially extended light source, wherein the images in the constellation are mixed to form a target illumination pattern having a sharp-edge at least along a portion of a boundary, wherein the images include a focused image, and wherein an edge of the focused image participates in forming the sharp-edged boundary the target illumination pattern, wherein the freeform optical surface illuminated by a zero-étendue light source forms a deblurred illumination pattern produced by deblurring the target illumination pattern with a spatially variant blur function, wherein the spatially variant blur function defines a blur of the target illumination pattern resulted from illuminating an initial freeform optical surface with the spatially extended light source, wherein the initial freeform optical surface is determined for transforming incident light emitted by the zero-étendue light source into the target illumination pattern.

2. The optic of claim 1, wherein the images include an unfocused image forming interior of the target illumination pattern.

3. The optic of claim 1, wherein at least two images in the constellation of images are adjacent to each other to form a first smooth joint image having a first intensity, and wherein at least two images in the constellation of images are at least partially overlay each other to form a second smooth joint image having a second intensity, wherein the images forming the second smooth joint image are smeared and overlaid such that a difference between a first intensity and a second intensity is less than a threshold.

4. The optic of claim 1, wherein a rate of change of light intensity across the sharp-edge of the target illumination boundary is substantially similar to the rate of change of the light intensity at an edge of the focused image.

5. The optic of claim 1, wherein the target illumination pattern includes a glyph.

6. The optic of claim 1, wherein the target illumination pattern includes letters forming a word.

7. The optic of claim 1, wherein the target illumination pattern is an asymmetrical low-high beams pattern for illumination of a road surface.

8. The optic of claim 1, wherein a surface of the optic opposite to the freeform optical surface is frosted, such that the illumination pattern is formed on the frosted surface.

9. A luminaire, comprising:
the optic of claim 1; and
the spatially extended light source arranged in the luminaire to emit the light onto the freeform optical surface to produce the target illumination pattern.

10. The luminaire of claim 9, wherein the spatially extended light source includes a light-emitting diode (LED).

11. The luminaire of claim 9, wherein the shape of the freeform optical surface is a function of the shape of the emitting area of the spatially extended light source and an arrangement of the spatially extended light source with respect to the freeform optical surface.

12. The luminaire of claim 9, wherein the luminaire forms at least a part of a headlight of a vehicle, wherein the spatially extended light source emits the light beams along an optical axis of the headlight to produce the target illumination pattern including an asymmetrical low-high beams pattern for illumination of a road surface.

13. The method for fabricating an optic, comprising:
determining a deblurred illumination pattern by deblurring a target illumination pattern with a spatially variant blur function; and
determining a freeform optical surface transforming incident light emitted by a spatially extended light source into a constellation of images of the spatially extended light source, wherein the freeform optical surface is determined for a zero-étendue light source such that the freeform optical surface illuminated by the zero-étendue light source forms the deblurred illumination pattern, wherein the images are mixed to form a target illumination pattern having a sharp-edge at least along a portion of a boundary, wherein the images include a focused image, and wherein an edge of the focused image participates in forming the sharp-edged boundary the target illumination pattern; and
fabricating the optic having the freeform optical surface.

14. The method of claim 13, wherein the freeform optical surface is fabricated on one or both sides of the optic.

15. The method of claim 13, further comprising:
determining an initial freeform optical surface transforming incident light emitted by a zero-étendue light source into the target illumination pattern;
determining a spatially variant blur function that captures a blur of the target illumination pattern illuminated by a spatially extended light source; and
deblurring the target illumination with the spatially variant blur function to determine the deblurred illumination pattern.

16. The method of claim 13, wherein the illumination pattern is an asymmetrical low-high beams pattern for illumination of a road surface.

17. A non-transitory computer readable storage medium embodied thereon a program executable by a processor for performing a method, the method comprising:
  determining an initial freeform optical surface transforming incident light emitted by a zero-étendue light source into a target illumination pattern;
  determining a spatially variant blur function that captures a blur of the target illumination pattern illuminated by a spatially extended light source;
deblurring the target illumination with the spatially variant blur function to determine a blurred illumination; and
  determining a freeform optical surface transforming incident light emitted by a zero-étendue light source into the target illumination pattern, such that the freeform optical surface transforming incident light emitted by the spatially extended light source into a constellation of images of the extended light source, wherein the images are mixed to form the target illumination pattern having a sharp-edge at least along a portion of a boundary, wherein the images include a focused image, and wherein an edge of the focused image participates in forming the sharp-edged boundary the target illumination pattern.

18. An optic having a freeform optical surface transforming incident light emitted by a spatially extended light source into a constellation of images of the spatially extended light source, wherein the images in the constellation are mixed to form a target illumination pattern having a sharp-edge at least along a portion of a boundary, wherein the images include a focused image, and wherein an edge of the focused image participates in forming the sharp-edged boundary the target illumination pattern, wherein at least two images in the constellation of images are adjacent to each other to form a first smooth joint image having a first intensity, and wherein at least two images in the constellation of images are at least partially overlay each other to form a second smooth joint image having a second intensity, wherein the images forming the second smooth joint image are smeared and overlaid such that a difference between a first intensity and a second intensity is less than a threshold.

* * * * *